UNITED STATES PATENT OFFICE.

GUSTAV SCHWARZWALD, OF NEW YORK, N. Y., ASSIGNOR OF TWO-FIFTHS TO HENRY NEWMAN, OF SAME PLACE.

MANUFACTURE OF FLOOR-CLOTH, &c.

SPECIFICATION forming part of Letters Patent No. 332,841, dated December 22, 1885.

Application filed March 5, 1885. Serial No. 157,838. (Specimens.)

*To all whom it may concern:*

Be it known that I, GUSTAV SCHWARZWALD, a citizen of the United States, residing in the city and county of New York, in the State of New York, have invented new and useful improvements in floor-cloths, coverings, decorations, pavements, panels, mosaic work, tilings, and kindred structures, and in the process of manufacturing the same; and I do hereby declare that the following is a full, clear, and exact description of the invention, which will enable others skilled in the art to which it appertains to make and use the same.

This invention has for its object an improvement in such of the above-mentioned structures, and in the manufacture of the same, as are composed of plastic materials having colored figures or patterns; and it consists in constructing the pattern by making each member of the same of material colored throughout its entire mass, as distinguished from painting, printing, embossing, or otherwise depositing the pattern-colors upon or into the body or layer of plastic materials, and at the same time in making the pattern homogeneous. As such articles have been generally made heretofore, a body or sheet of plastic material has been prepared, of some selected color, which may be designated, with reference to the pattern, as the "groundwork." Upon this groundwork the design has then been produced by painting or printing or embossing, or in other ways working colored materials upon or into the groundwork. By my invention I do away altogether with the preparation of a groundwork, and produce a much more durable pattern than such as have been heretofore known.

In carrying out my invention I proceed as follows: I first lay out a suitable pattern in outline upon a sheet of paper or other material, and determine the shapes and sizes of the different members or figures of the pattern. For each member of the pattern a separate mold or form is then made of the desired shape in cross-section, so that when all the different forms are placed together in proper position they will compose the pattern designed. If, now, a mass of plastic material is forced through these molds, the result will be a pattern of the desired configuration, less the thickness of the molds. To overcome this reduction and make them even and contiguous, the discharging edges of the various molds are finished down to substantially knife-edges, preferably grinding or filing down the material of each mold to flare outward, funnel-shaped; or some of the molds may be also slightly shortened at the delivery end, so that the wall of one form or mold may answer as the dividing-line on the delivery-edge for the adjoining molds or forms; but all the molds must be thinned at their outer edges, flaring from within, to produce the best results. These molds may be made of any desired depth, and may decrease in size away from the delivery-edge, and at their other ends be suitably threaded to have the ends of the feeding pipes or tubes screwed into or over them.

In some patterns I may form all or any of the molds of properly-shaped tubes or pipes having the mold configuration in cross-section throughout their entire length; but I prefer to make the molds or forms independent of the feeding-tubes, especially for work in which the plastic material requires to be tempered, as by such a structure I can introduce a suitable temperer to reach each tube in the system, whereas, if the tubes are of the same size as the molds or forms throughout their entire length, the structure would have no open spaces between the feeding-tubes, and could not be so readily tempered.

In order to work the process most readily, the feeding-tubes should be carefully proportioned in size to the pattern-forms, so that the tube supplying each member of the pattern will discharge a proportionately equal mass of material at the same pressure; but if in any pattern it can be more conveniently done the supply-tubes of such members of the pattern as require a greater or less pressure to discharge the appropriate mass of material may be subjected to such different pressure in the operation. The whole system of molds and feeding-tubes is then fastened together in any suitable manner, so that at the discharging-edges all the forms will be even. They may be fastened together by screwing each mold to its neighbor, or by soldering them together; or in some cases the forms for the pattern may be cast together, or when the molds taper away from the discharging ends, like funnels, they may be inserted in suitable openings in a plate, and over their smaller ends the feeding-pipes secured to hold them firmly in position during the working of the process, and for this purpose they are secured to a suitable bed or table. Around the system of feeding-pipes a suitable jacket may be arranged to receive steam, hot or cold water or air, or other temperer that may be desired for the particular plastic composition to be manipulated.

In front of the discharging or delivery face of the pattern-forms I arrange a suitable plate, which I call the "platen," having a plane face toward the molds, and made hollow or with a chamber, so that it also may be readily heated or cooled, when desired, in the process. This plate is made large enough to receive the entire discharge of all the molds at once, and it is adjusted to slide in grooves or otherwise, so as readily to be moved up to and away from the molds, as occasion requires.

When desired, I interpose a suitable sheet of fabric to form a base between the platen and the molds, and such fabric is pushed and held close up to the discharging-face of the molds by the platen. In suitable positions relative to the platen and the molds I arrange drums or cylinders on which to dispose the fabric for the base, so that it can be paid out as needed and carried away after the operation. A cutter or knife of suitable form is adjusted to be readily operated across the face of the molds to cut off the plastic material that has been ejected at the thickness required.

When desired, I arrange between the paying-out cylinder of the base fabric and the platen a suitable trough and brushes or other distributers to deposit a layer of cement or other holder upon the base fabric before the pattern mass is laid thereon. In most instances, however, the base fabric is suitably prepared in advance, and the cementing composition has been dried thereon, and is then rendered active by the heat imparted thereto by the heated platen. So, also, if it is desired to secure the pattern mass directly to panels, mantel-boards, &c., or when, for any reason, a base fabric is not to be secured to the mass in the operation of forming it, I may, instead of depositing it against the platen, as described, discharge it into a suitable receiving-pan that will retain it in shape, and it may thereafter be suitably treated and cut up into slabs or layers by a band-knife or other suitable device for the purposes required. Near the other end of the feeding tubes or pipes, which I call the "feeding end," I arrange a movable plate, which is arranged to work in ways, and is operated by a screw or lever or in any convenient manner. By this plate, which I call the "follower-plate," I operate pistons to push the plastic material through the tubes toward and out of the pattern-forms. These pistons may be made of any suitable material; but I prefer to provide them with metal heads fitting snugly in the feeding-pipes, the heads being attached to rods or bars of suitable length to eject the composition through the tubes. These pistons are preferably secured to the follower-plate, which may be done by screwing them thereto, or by a suitable locking device, so that they may be withdrawn simultaneously, to permit feeding the plastic material into the pipes from time to time as these are exhausted.

The feeding tubes or pipes are charged with the plastic material, to be worked in any convenient manner. For example, I may fill all the tubes before they are screwed to the pattern-forms, and take them out for filling as required; or I may use auxiliary tubes, which are filled by workmen with the proper composition while the process of manufacture is going on, and the composition is then pushed from these auxiliary tubes into the feeding-tubes by means of a suitable plunger.

The method of operation is as follows: The plastic material to be used having been prepared in suitable colors, the feeding-tubes are all properly charged therewith, the followers are inserted therein, the platen carrying the base fabric is pushed close against the mold end of the form, the pistons are all driven forward by the follower-plate until enough material has been ejected or pressed out to give the required thickness to the layer on the base fabric, which, pressing out of the plastic material, moves back the platen to the extent of its thickness; then the platen is moved still farther back, to permit the knife to operate freely and cut off the layer of plastic material close to the face of the pattern-mold. When this has been done, the knife is again carried out of the way, the base fabric is advanced a step to receive the next impression or layer of the pattern next to the one cut off, and the operation is continued until the required amount of material is made up. I have found it well to withdraw the follower-plate slightly while the knife is being used, so as to have no pressure in the rear of the mass during the cutting.

Of course, for many purposes—such as coverings for various articles of furniture, panels, mantel-boards, &c.—a complete pattern may be conveniently made at each cutting of the entire design required, while for floor-cloths and other purposes requiring a large area the pattern is more conveniently made by depositing a number of facings, one after the other, upon a shifted base fabric, as described. The plastic composition may also be deposited in thick layers, to be afterward reduced by splitting to form several or a number of layers, which may then be cemented to a base or directly to the furniture, &c., as required.

The plastic materials, the pigments for coloring the same, the methods of cooling, heating, drying, trimming, pressing, grinding, or cutting down the face of the material or splitting the same when desired after the patterns are formed, attaching or cementing the layers to a base or to the article on which the same are to be applied may be such as are well known in the arts.

It will also be apparent that a great variety of effects may be produced with any pattern by simply changing the colors of the different members of the pattern.

In this article the patterns retain their colors until the entire structure is worn out, and thereby a much more durable pattern results from the process described than when the colors are simply laid on or embossed into the groundwork of the surface, as has been customary heretofore.

I am aware that it has been proposed to make floor-cloth and coverings of plastic materials in different colors by means of trays supported over a base, a tray being provided with openings through which material of one color in the configuration desired is to be deposited upon the base; then another tray is to be employed with openings through which material of another color in the configuration desired is to be deposited upon the base, and a pattern built up by using successively independent trays for each color; also, that it has been proposed to cut or stamp pattern shapes out of sheets of plastic materials of various colors, then join these shapes at their edges by cement, and then cement the resulting structure to a base; and I make no claim to any such structure or process.

What I claim as new, and desire to secure by Letters Patent, is—

1. A covering made of plastic materials in figures of various colors by depositing the individual figures of the pattern simultaneously and contiguously through independent feeding-tubes, substantially as described.

2. In the art of making cloths or coverings in patterns of various colors, the process of depositing the plastic material for each member of the pattern by means of an independent feeding-pipe, substantially as set forth.

3. In the art of making cloths or coverings of plastic materials in patterns containing various colors, the process of forming the figures of the pattern by forcing the mass of material forming each figure through an independent mold of the configuration desired, substantially as set forth.

4. The process of making cloths or coverings of plastic materials in patterns of various colors by depositing masses of the materials constituting the members of the pattern independently of each other and simultaneously upon a suitable surface, substantially as set forth.

5. In the art of making cloths or coverings of plastic materials in various colors, in which each color of the pattern consists of a mass of material entirely of such color, the process of making the layer of material homogeneous in structure by depositing such masses simultaneously and contiguously upon a suitable surface, substantially as set forth.

6. The process of making cloths or coverings of plastic materials in patterns of various colors, consisting of making each color of the pattern of material of such color throughout its entire mass, depositing the same according to the pattern contiguously and simultaneously to the required thickness on a suitable surface, and thereafter finishing the same, substantially as set forth.

7. The process herein described of making floor, wall, and other coverings, which consists in depositing simultaneously a number of contiguous sections of plastic material in different colors upon a suitable foundation and then drying and finishing the same, substantially as set forth.

GUSTAV SCHWARZWALD.

Witnesses:
NELSON ZABRISKIE,
J. OSCAR WEEKS.